United States Patent [19]
Glendenning et al.

[11] 3,866,501
[45] Feb. 18, 1975

[54] TUBE SHEAR MACHINE

[75] Inventors: Don M. Glendenning, Dexter, Mo.; Louis Bledstein, Indianapolis, Ind.

[73] Assignee: Arvin Industries, Inc., Columbus, Ind.

[22] Filed: Nov. 5, 1973

[21] Appl. No.: 412,654

[52] U.S. Cl............. 83/382, 83/54, 83/456, 83/519, 83/699, 83/700, 83/581
[51] Int. Cl............................. B23d 21/02
[58] Field of Search....... 83/54, 581, 382, 454, 456, 83/513, 519, 699, 700

[56] References Cited
UNITED STATES PATENTS

| 2,879,844 | 3/1959 | Tuttle | 83/519 X |
| 3,374,697 | 3/1968 | Robinson | 83/54 X |

FOREIGN PATENTS OR APPLICATIONS

| 43-11357 | 0/1968 | Japan | 83/581 |
| 248,527 | 7/1970 | U.S.S.R. | 83/581 |

Primary Examiner—J. M. Meister
Attorney, Agent, or Firm—Trask, Jenkins & Hanley

[57] ABSTRACT

A machine for shearing one end of metal tubing at a pair of predetermined angles. A combination clamp and cutting die clamps the tubing in position, and a pair of shear blades are sequentially actuated to angularly shear the end of the tubing. The shear blades are angularly adjustable so that the end of the tubing can be sheared at any predetermined pair of angles.

14 Claims, 8 Drawing Figures

TUBE SHEAR MACHINE

BACKGROUND OF THE INVENTION

This invention relates to apparatus for shearing the end of a length of metal tubing at preselected angles, and more specifically to a machine for accurately shearing one end of said tubing at an angle to permit subsequent joinder of the tubing in a miter joint.

Tubing must frequently have one end sheared at one or more predetermined angles with respect to the tube center line to permit it to be joined together as by welding with matingly sheared tubing to form a miter joint. This is commonly the case with steel tubing used in the fabrication of automobile exhaust systems. For example, the right and left-hand exhaust manifold pipes leading from the engine are commonly welded together and to a single rearwardly extending exhaust pipe at a miter joint to form an open exhaust passage to carry all of the generated exhaust gases rearwardly from the engine to the muffler and the tailpipe. The ends of the right and left-hand manifold pipes must be accurately sheared at two different specified angles to permit the two pipes to be welded together as well as to the single exhaust pipe and form a gas-tight seal at their juncture.

The most common way to shear the end of steel tubing at a specified angle is to clamp the tubing in position, make one angular cut, and then unclamp the tubing. If the end of the tubing is to be cut at a double angle with respect to its center line, then the cutting procedure is simply repeated. That is, the tubing must be repositioned in the clamp and the second cut made at the proper angle with respect to the first cut. This procedure is both time consuming and inherently inaccurate. The tubing must be taken out of the clamp and accurately repositioned in the clamp before the second cut can be made. It is extremely important that the second cut be made at precisely the correct angle with respect to the first cut if the tubing is to properly fit a miter joint. Because of the difficulties in accurately positioning the tubing for a second angular cut, many cuts are made imprecisely resulting in a large quantity of tubing which must be scrapped.

The present invention overcomes the above-mentioned difficulties and problems by providing a tube shear machine adapted to make one or both of the required angle cuts on the end of the tubing at a single clamping station to insure the angular relationship between the cuts. Moreover, the present invention provides a machine which is easy to use and relatively compact in size.

SUMMARY OF THE INVENTION

In accordance with the preferred form of the invention, there is provided a work table having a lower die block mounted thereon. A hydraulic cylinder is mounted on said table with its ram connected to a frame supported from said table for vertical movement thereon. An upper die block is connected to said frame and is movable therewith to and from a cooperative position with said lower die block for clamping a length of tubing therebetween. Each of said die blocks is provided with a pair of cutting faces disposed at an angle to the center line of the tubing.

A pair of support arms are swingably connected to said table adjacent said lower die block and radiate outwardly therefrom. Hydraulic cylinders are mounted on said support arms with their ram projecting toward said die blocks. Slides are connected to the ends of the rams and each carries a cutting blade adapted to slide against one of the cutting faces on the die blocks for shearing the end of the tubing carried in said die blocks.

An electrical control system is operatively connected to the hydraulic cylinders for moving the upper die block frame and the cutting blade slides for sequentially closing said die blocks and moving the cutting blades against the cutting faces of the die blocks.

BRIEF DESCRIPTION OF THE DRAWINGS

The accompanying drawings illustrate the invention. In such drawings:

FIG. 6 is a horizontal section taken on the line 6—6 of FIG. 2;

DETAILED DESCRIPTION OF THE PREFERRED EMBODIMENT

Figure 1:
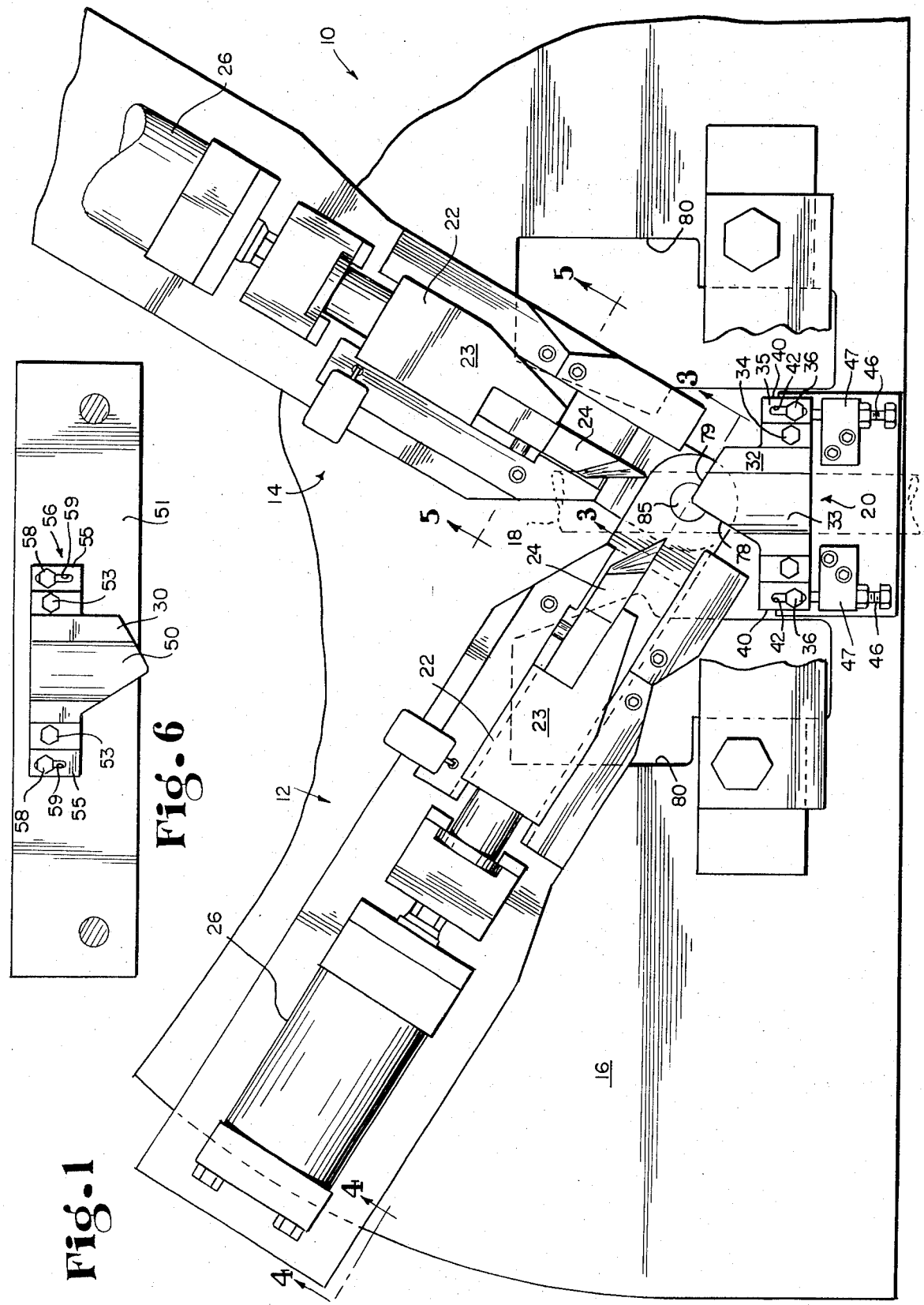
FIG. 1 is a top plan view of a tube shear machine embodying the invention.

A tube shear machine 10 embodying the invention is shown in FIG. 1 and generally comprises left and right-hand shear arms 12 and 14 adjustably mounted on a machine table 16 in operative relationship with a combination clamp and die block assembly 20 adapted to hold a length of tubing 18. The table 16 is supported in an elevated position above the floor on a plurality of legs (not shown). Each of the arms 12 and 14 has a double acting hydraulically actuated cylinder 26 mounted thereon. Each of the cylinders 26 has a ram 22 provided with a slide 23 projecting outwardly therefrom toward the die block assembly 20, and a shearing blade 24 is mounted on the outer end of each slide. The cylinders 26 are responsive to control means which will be described in greater detail hereinafter to cause their rams to sequentially move their associated shear blades 24 forward to angularly shear the end of the tubing 18.

Figure 2:
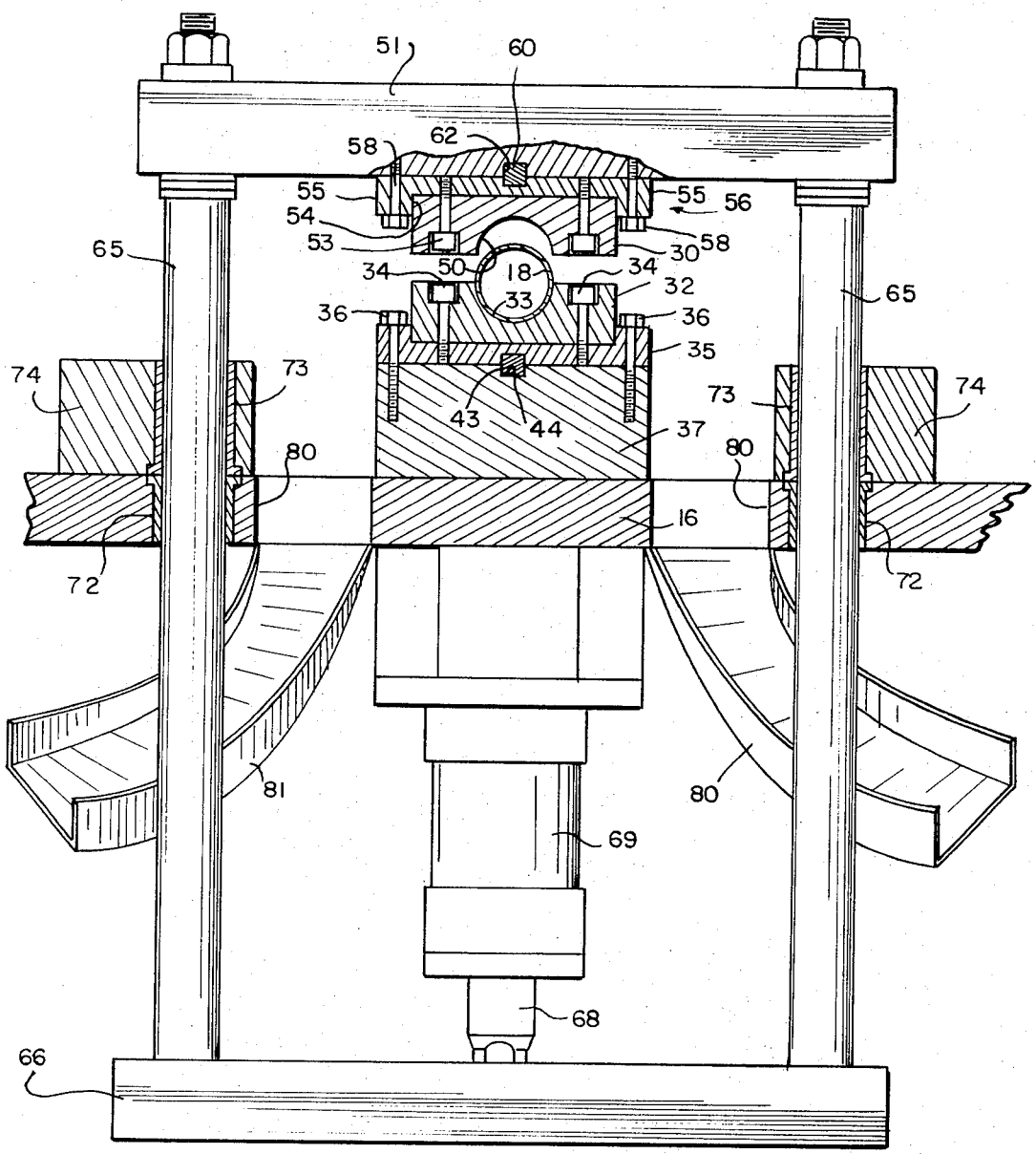
FIG. 2 is a front elevation view of a tube shear machine shown in FIG. 1, but with portions thereof being broken away.

As shown best in FIG. 2, the tubing 18 is releasably clamped in position for shearing in the combination clamp and die block assembly 20, which is formed of upper and lower die blocks 30 and 32, respectively. The lower die block 32, which is provided with a tube-receiving recess 33 in its upper face, is connected as by bolts 34, to an adjusting block 35. The adjusting block 35 is in turn mounted, as by bolts 36, on a support block 37 fixedly mounted on the table 16. The die block 32 is laterally supported on the upper face of the adjusting block 35 in a recess 38 formed in block 35 by a pair of laterally spaced upstanding ribs 40. As shown in FIG. 1, the bolts 36 interconnecting the adjusting and support blocks 35 and 37 extend through elongated slots 42 formed in the ribs 40 for releasably locking the adjusting block 35, and thus die block 32 in the desired fore and aft position of adjustment. In order to provide a fine adjustment for the positioning of the block 35, adjusting screws 46 are mounted in guides 47 on the support block 37 to engage said block. The fore and aft adjusting movements of the block 35 are guided by a key 43 carried in mating keyways 44 in the abutting faces of the blocks 35 and 37.

The upper die block 30 has a downwardly open tube-receiving recess 50 in its lower face, as shown in FIG. 6, and is supported from a cross bar 51 in a manner similar to that just described for the lower die block 32. Thus, the block 30 is mounted, as by bolts 53 in a recess 54 formed by a pair of laterally spaced, downwardly projecting ribs 55 on an adjusting block 56. The block 56 is releasably mounted in the desired fore and aft position by bolts 58 extending through elongated slots 59 and received in the cross bar 51. The fore and aft adjusting movements of the block 56 are guided by a key 60 fitted within mating keyways 62 formed in the abutting faces of adjusting block 56 and cross bar 51. Adjusting screws, like screws 46, can also be provided for fine adjustment, if desired, but are not shown in the drawings for purposes of clarity.

As shown in FIG. 2, the cross bar 51 is rigidly connected at its opposed ends to a pair of posts 65 which are in turn connected at their lower ends to a second or lower cross bar 66 disposed below the table 16. The cross bar 66 is connected in any conventional manner to the piston 68 of a double acting hydraulic cylinder 69 mounted on the bottom of the table and projecting downwardly therefrom. Thus, when cylinder 69 is actuated to move its piston 68 downwardly, the lower cross bar 66, acting through the posts 65, will pull the upper cross bar 51 downwardly to move the upper die block 30 into abutting engagement with the lower die block 32. To guide such movement, the posts 65 are slidably carried in bearings 72 and 73 mounted respectively in the table 16 and in a pair of bearing blocks 74. As will be apparent, with the block 30 moved into its lowermost position, it engages the block 32 and their cooperative recesses 33 and 50 clamp the tubing 18 into position for shearing.

As shown in FIG. 1, the faces of the upper and lower die blocks 30 and 32 adjacent the shear arms 12 and 14 together form left and right-hand cutting faces 78 and 79 respectively. The faces 78 and 79 are shaped to correspond to the desired pair of angles with respect to the center line of the tubing at which said tubing is to be sheared. For example, the left-hand cutting face 78 corresponds to the approach angle of the right-hand shear blade, and the right-hand cutting face 79 corresponds to the approach angle of the left-hand shear blade.

Various die blocks having cutting faces disposed at any desired angle can be formed to permit the tubing 18 to be sheared at any desired angle or pair of angles. Die blocks having cutting faces formed at various angles are interchangeable by merely unbolting the upper and lower die blocks from the upper and lower adjusting blocks 56 and 35, respectively, and replacing them with sets of said die blocks.

As shown in FIGS. 1 and 2, a pair of openings 80 are formed in the table 16 on opposite sides of the support block 37 through which cut-off portions of the tubing 18 can fall. Conveniently, a pair of chutes 81 extend downwardly from the openings for directing the cut-off portions into scrap collecting containers (now shown).

Figure 3:
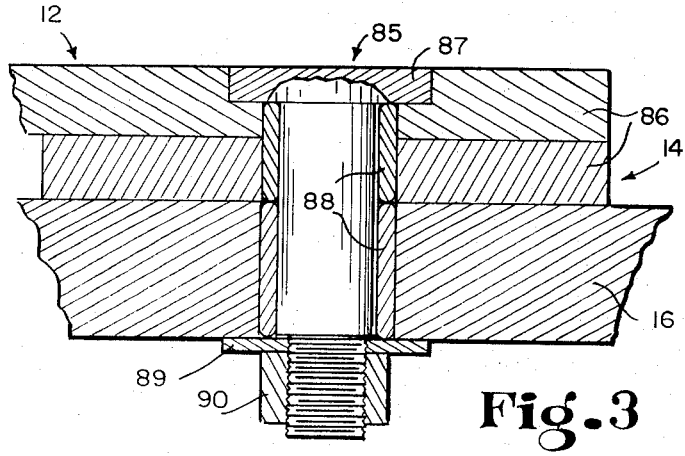
FIG. 3 is an enlarged vertical section taken on line 3—3 of FIG. 1.

The shear arms 12 and 14 are angularly adjustable with respect to each other. To this end, the ends of the arms adjacent the die blocks 30 and 32 are pivotally connected about a common pivot pin 85 extending through the table 16. As shown in FIG. 3 the pivoted ends of the arms 12 and 14 have overlapping tongues 86 through which the pin 85 extends. As shown, the pin 85, which is in the form of a bolt, has a head 87 countersunk in the tongue 86 of arm 12 and a shank carried in bearings 88 mounted in the pin-receiving openings in the arms and table. A washer 89 and nut 90 are mounted on the lower end of the pin 85 for connecting said pin to the table and thus bindingly retaining the inner ends of arm 12 and 14 in the desired angular relationship.

Figure 4:
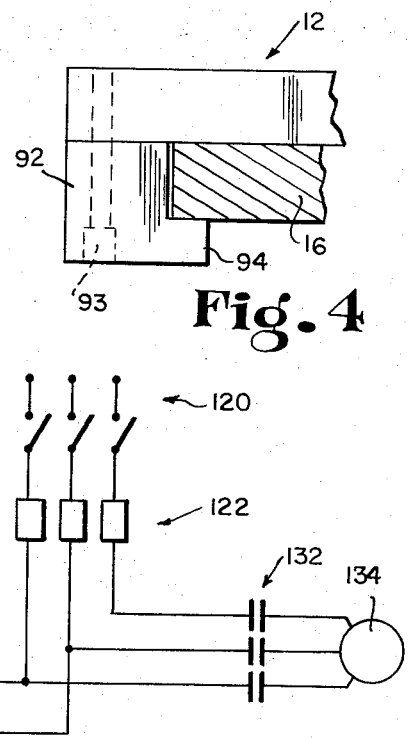
FIG. 4 is a vertical section taken on line 4—4 of FIG. 1.

The arms 12 and 14 radiate outwardly from the die blocks 30 and 32 with their ends remote from said blocks being releasably fixed to the table 16 as by toe clamps 92. The connections of the toe clamp to each arm is identical. As shown in FIG. 4, the clamp 92 is connected to the underside of arm 12 by a bolt 93 and has a toe 94 engaging the underside of the table 16. Thus when the arms 12 and 14 are swung into the desired angular relationship, their toe clamps 92 are tightened down to bindingly retain them in position.

In the use of the toe clamps 92 it is essential that the table 16 is semicircular in shape with the center of the pivot pin 85 forming the center of the circle. Also, the shear arms 12 and 14 should have the same length which is slightly longer than the radial length of the table. In this manner, both of the shear arms 12 and 14 can be rotated about the pin 85 to selectively vary the shearing angle of each of the arms 12 and 14. The arms 12 and 14 are thus pre-set to shear the tubing 18 at any desired pair of shearing angles with the toe clamps 92 bindingly engaging the underside of the table to thereby fix the shear arms 12 and 14 in position during the shearing process.

Figure 5:
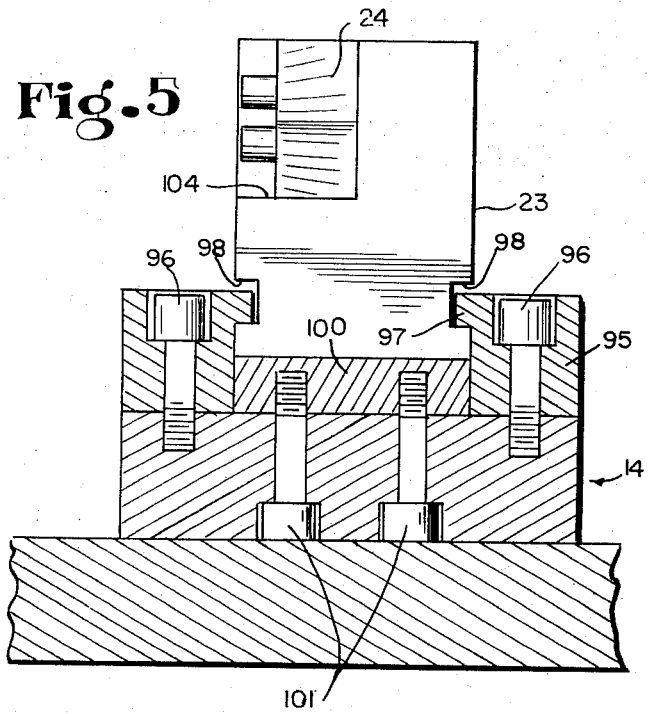
FIG. 5 is an enlarged vertical section taken on line 5—5 of FIG. 1.

The shear arm 14 is shown in cross-section in FIG. 5, and is representative of the construction of both arms 12 and 14. The ram slide is guided during its movement between its rearward idle position and forward shearing position by a gib 95 connected to the arm 14 on each side of the ram 22, as by bolts 96. Each of the gibs 95 includes a longitudinal lip 97 received in slots 98 formed in the side faces of slide 23 to guide and control the movements of said slide. Desirably, a wear plate 100 formed of a hardened steel or the like is connected to the arm 14, as by bolts 101, and disposed beneath the slide 23 to provide a durable sliding surface to increase the service life of the machine.

Figure 7:
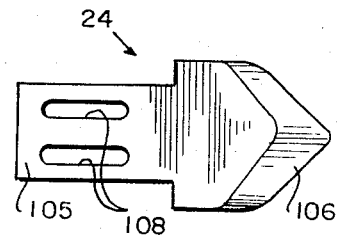
FIG. 7 is a side elevation of a shearing blade.

The shear blade 24 is carried in a recess 104 in a side face of the slide 23 and projects forwardly therefrom. As shown in FIG. 7, each of the blades comprises an elongated shank 105 having a hardened shearing point 106 at its forward end adapted to ride against the die block cutting face 78 in the case of the blade on arm 12 and the cutting face 79 in the case of the blade on arm 14. A pair of elongated slots 108 are formed in the blade shank 105 for the reception of bolts 109 for bolting the blade onto the slide 23. The rear end of the blade shank is disposed in abutting engagement with the forwardly presented face of the slide recess 104. As will be understood, it will be necessary to grind the blade point 106 from time to time. This foreshortens the overall length of the blade. However, to compensate for such foreshortening, the bolts 109 can be disposed at different locations along the length of the slots 108 and shims (not shown) can be interposed between the forwardly presented recess face and the rear face of the blade shank 105.

Figure 8:
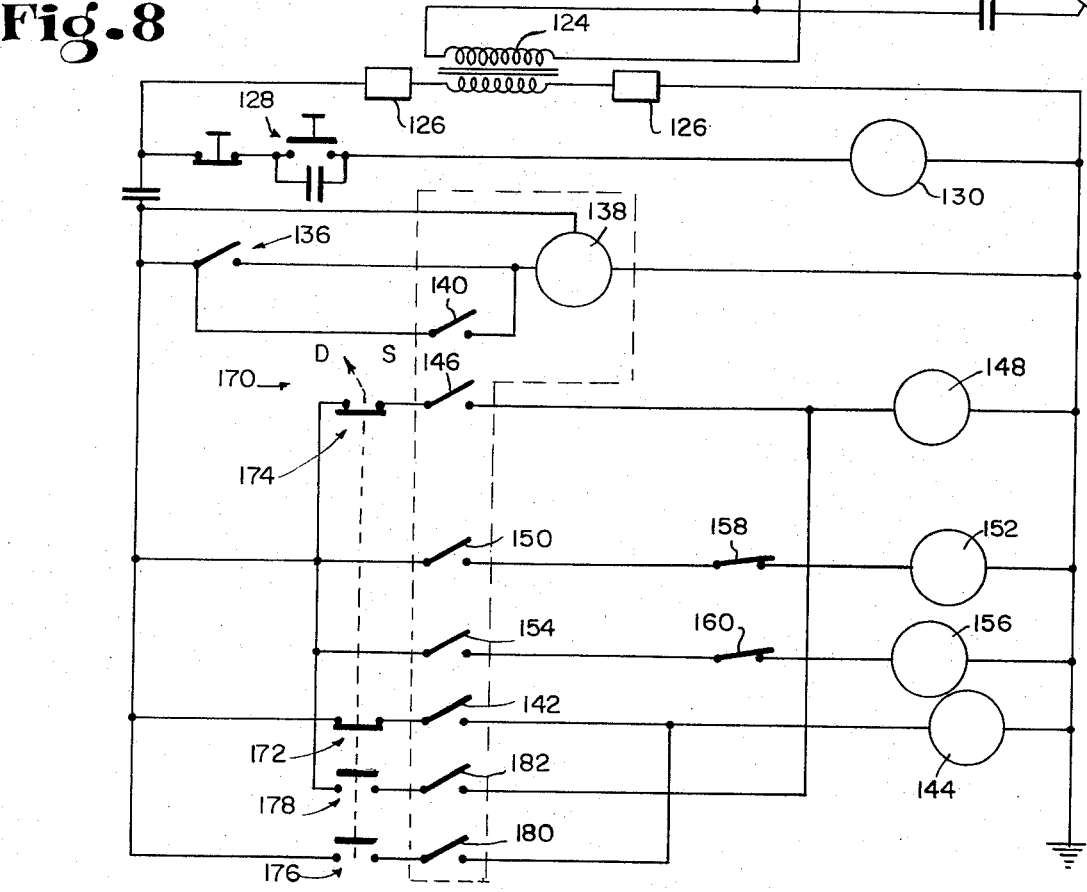
FIG. 8 is a diagrammatic representation of the machine control circuit.

A preferred control circuit for the machine is shown in FIG. 8 wherein electrical power is supplied from three-phase power lines 120 through fuses 122 and step-down transformer 124, which also can be protected by fuses 126. The machine is energized by a master on-off switch 128, which activates a motor relay 130 to close normally open contacts 132 and thereby start the motor 134.

The now energized machine is actuated by a switch 136, which is desirably a foot-operated switch for ease of operation. When the switch 136 is depressed, a rotary timer 138 is activated which cam-operates the sequential movements of the machine. The rotary timer 138 first closes a by-pass switch 140 which serves to bypass the foot switch 136 so that the machine operator need not hold the foot switch 136 in a depressed position.

The rotary timer 138 next closes a hydraulic pressure switch 142 to activate a relay 144 which in turn permits hydraulic pressure to rise to a pre-set level in all of the various machine components. This places the machine in a operationally ready condition.

The timer 138 then closes a clamping switch 146 to energize a relay 148 which in turn supplies hydraulic pressure to the hydraulic clamping cylinder 69 to cause said cylinder to pull the upper die block 30 downwardly into abutting engagement with the lower die block 32 to thereby tightly clamp the tubing 18 in position for shearing.

A ram switch 150 is then closed by the timer 138 which thereby activates a relay 152. The relay 152 causes hydraulic pressure to be supplied to the hydraulic cylinder 26 on the left-hand shear arm 12 as shown in FIG. 1 to cause its associated ram 22 to move the blade 24 forwardly against die block cutting face 79 to shear the tubing 18 at the predetermined angle. The switch 150 is then opened by the timer 138 to cause the left-hand ram to return to its original position.

A second ram switch 154 is then closed by the timer 138 to activate a relay 156 to cause hydraulic pressure to be supplied to the hydraulic cylinder 26 on the right-hand shear arm 14. This causes the right-hand ram 22 to move its associated cutting blade 24 forwardly against die block cutting face 78 to shear the tubing 18. Switch 154 then opens and the right-hand ram returns to its original position.

After the second shear has been made, and both rams 22 have returned to their original positions, the clamping switch 146 is opened by the timer 138 to open the die block assembly 20 so that the sheared tubing can be removed from the machine. Hydraulic pressure switch 142 then opens to relieve hydraulic pressure on the system and the switch 140 opens to turn off the rotary timer 138. At this point, the machine is ready for a second cycle.

Desirably, the left and right-hand shear arms 12 and 14 are provided with limit switches 158 and 160, respectively, which prevent both rams from simultaneously moving forward to shear the tubing 18 at the same time. The limit switches 158 and 160 are engageable with stops 161 on the rams 22 and each can be set to open whenever the opposite ram is not in a rearward position to thereby provide positive protection against both rams being in a forward operative position at the same time.

The control circuit can also include a normal-reverse switch (not shown) to control which of the left and right-hand rams will shear the tubing first. Also, a single-double switch can be provided to permit the machine operator to selectively set the machine to make a single angular cut on the end of the tubing, and the normal-reverse switch can be set to select which of the two rams will be actuated to shear the tubing. That is, the normal-reverse switch can be set to select which of the rams will be activated first in sequence to shear the tubing, and the single-double switch can be set in the single cut mode to render inoperative the second ram in the cutting sequence. If desired, the machine can be operated on a faster cycle in the single cut mode than in the double cut mode by controlling the machine in response to a pair of auxiliary control switches. For example, a single-double switch 170 can be operative to open contacts 172 to bypass the hydraulic pressure switch 142, and to open a second pair of contacts 174 to bypass the clamping switch 146. Concurrently, auxiliary contacts 176 and 178 can be closed to actuate auxiliary hydraulic pressure and clamping switches 180 and 182, respectively, when the machine is started. These auxiliary switches can be activated at a faster timing sequence than the double-cut mode switches to thereby operate the machine on a faster cycle.

In single-mode operation, the timer 138 first activates the auxiliary hydraulic pressure switch 180 to permit machine hydraulic pressure to rise to a pre-set level, and then activates the auxiliary clamping switch 182 to cause hydraulic pressure to be supplied to the clamping cylinder 69 to clamp the tubing in position for shearing. The selected ram can then be actuated by the timer 138 to shear the tubing, and the auxiliary clamping switch 182 and the auxiliary hydraulic pressure switch are sequentially opened by the timer 138 to unclamp the tubing and to relieve hydraulic pressure on the system.

As will be apparent from the foregoing description, this invention permits a pair of cuts to be made on the end of the tube with a single clamping action. There is no need to reposition the tubing between cuts. Further, various angles of cut can be made on tubing by adjusting the included angle between the shear arms 12 and 14. It is to be understood, however, that a change in the angular disposition of the arms 12 and 14 requires a change in the die blocks 30 and 32 so that the cutting faces 78 and 79 on said blocks will be disposed in alignment with the path of movement of the blades 24.

We claim:

1. A tube shear machine for shearing a length of tubing, comprising a machine table, a die assembly carried on said table for releasably clamping said tubing in position and defining a pair of angularly disposed cutting faces, a pair of cutting blades operatively supported on said table and movable with respect to said die assembly, first means for angularly adjusting the path of movement of said blades with respect to each other and with respect to said die assembly, and second means for moving each of said cutting blades along one of said angulated cutting faces to shear said tubing at a pair of angles.

2. A tube shear machine for shearing a length of tubing, comprising a machine table, a die assembly carried on said table for releasably clamping said tubing in position and defining a pair of angularly disposed cutting faces, a pair of angularly adjustable support arms rotatably mounted on said table, a pair of cylinders, a pair of slides movably carried on said support arms, and a pair of cutting blades mounted on said slides, said slides being connected to said cylinders and having said cutting blades mounted thereon, each of said cylinders being coupled to means for sequentially actuating said cylinders for moving each of said cutting blades along one of said angulated cutting faces to shear said tubing at a pair of angles.

3. A tube shear machine as recited in claim 2 in which said pair of support arms is rotatably connected at one of their ends to said table at a point adjacent said die assembly, and means are provided for releasably connecting their opposite ends to said table.

4. A tube shear machine as recited in claim 2 with the addition that means are provided at each end of each of said support arms for bindingly retaining said arms in the desired angular position on said table.

5. A tube shear machine for shearing a length of tubing, comprising a machine table, a die assembly carried on said table for releasably clamping said tubing in position and defining a pair of angularly disposed cutting faces, a pair of angularly adjustable support arms rotatably mounted on said table, a pair of cylinders having rams projecting outwardly therefrom, a slide connected to each of said rams, guide means on each of said arms for guiding the movements of the slide thereon, means coupled to each of said cylinders for sequentially actuating said cylinders, a pair of cutting blades mounted on said slides and projecting outwardly therefrom and movable along said angulated cutting faces to shear said tubing at a pair of angles, and means for adjustably mounting said blades on said slides to project the desired distance outwardly therefrom.

6. A tube shear machine as set forth in claim 5 in which each of said cutting blades has a cutting point disposed outwardly from said slide and a shank received in a recess formed in said slide, and said means for adjustably mounting said blades comprises elongated slots formed in said shanks and fastening means extending through said slots and received in said slide.

7. A tube shear machine as recited in claim 1 wherein said die assembly comprises a first die block carried on said table, a cross bar, a pair of posts movably carried in said table and supporting said cross bar above said table, a second die block mounted on said cross bar, means for moving said posts for moving said second die block into abutting engagement with said first die block to clamp said tubing in position for shearing, said first and second die blocks having mating recesses formed therein for reception of said tubing.

8. A tube shear machine as set forth in claim 7 with the addition that means are provided for adjusting the fore and aft position of said first die block.

9. A tube shear machine for shearing a length of tubing, comprising a machine table, a first die block supported on said table, a frame mounted on said table, a second die block mounted on said frame, means for moving said frame to dispose said second die block in abutting engagement with said first die block, said first and second die blocks having tube-receiving recesses and defining a pair of cutting faces angulated with respect to the center line of the tubing, a pair of angularly adjustable support arms mounted on said table, a pair of slides each slidably mounted on one of said support arms, a cutting blade mounted on each slide, and means for sequentially actuating said means for moving said frame and for moving each of said slides to move said cutting blades along said angulated cutting faces to shear the tubing.

10. A tube shear machine for shearing a length of tubing, comprising a machine table, a first die block mounted on said table, a cross bar, a pair of posts connected to said cross bar and slidably carried in said table, a second die block mounted on said cross bar, first means for moving said cross bar to move said second die block into and out of engagement with said first die block, said die blocks having mating recesses formed therein for gripping said tubing between said die blocks and having at least one cutting face formed thereon, at least one support arm rotatably mounted on said table adjacent said first die block, means releasably retaining said support arms in parallelism with said cutting face, a slide movably carried on said support arm, a cutting blade mounted on said slide, and second means connected to said slide for moving said cutting blade across said cutting face for shearing a length of tubing gripped between said die blocks.

11. A tube shear machine for shearing a length of tubing, comprising a machine table, a pair of die blocks operatively carried from said table and having a pair of cutting faces, a first hydraulic cylinder for moving one of said die blocks to and from an operative position of engagement with the other of said die blocks for bindingly gripping a length of tubing therebetween, a first cutting blade, a second hydraulic cylinder operatively connected to said first cutting blade for moving said first cutting blade across one of said cutting faces, a second cutting blade, a third hydraulic cylinder operatively connected to said second cutting blade for moving said second cutting blade across the other of said pair of cutting faces, first switching means operatively coupled to said first hydraulic cylinder for selectively supplying hydraulic pressure thereto for moving said one of said die blocks to and from engagement with the other of said die blocks, second switching means operatively coupled to said second hydraulic cylinder to selectively supply hydraulic pressure to said second cylinder for moving said first cutting blade, third switching means operatively coupled to said third hydraulic cylinder to selectively supply hydraulic pressure to said third cylinder for moving said second cutting blade, and timing means operatively connected to said first, second, and third switching means for selectively actuating said switching means.

12. A tube shear machine as set forth in claim 11 with the addition that means are coupled to said second and third switching means and for preventing said second and third switching means from being closed simultaneously.

13. A tube shear machine as set forth in claim 11 with the addition that fourth switching means are coupled to said timing means for controlling the sequence of actuating said second and third switching means.

14. A tube shear machine as set forth in claim 11 with the addition that means are provided for selectively rendering one of said second and third switching means inoperative.

* * * * *